Dec. 2, 1958  J. G. BROWN  2,862,233
METHOD AND APPARATUS FOR THE MANUFACTURE
OF PHONOGRAPH RECORDS
Filed April 23, 1956  2 Sheets-Sheet 1
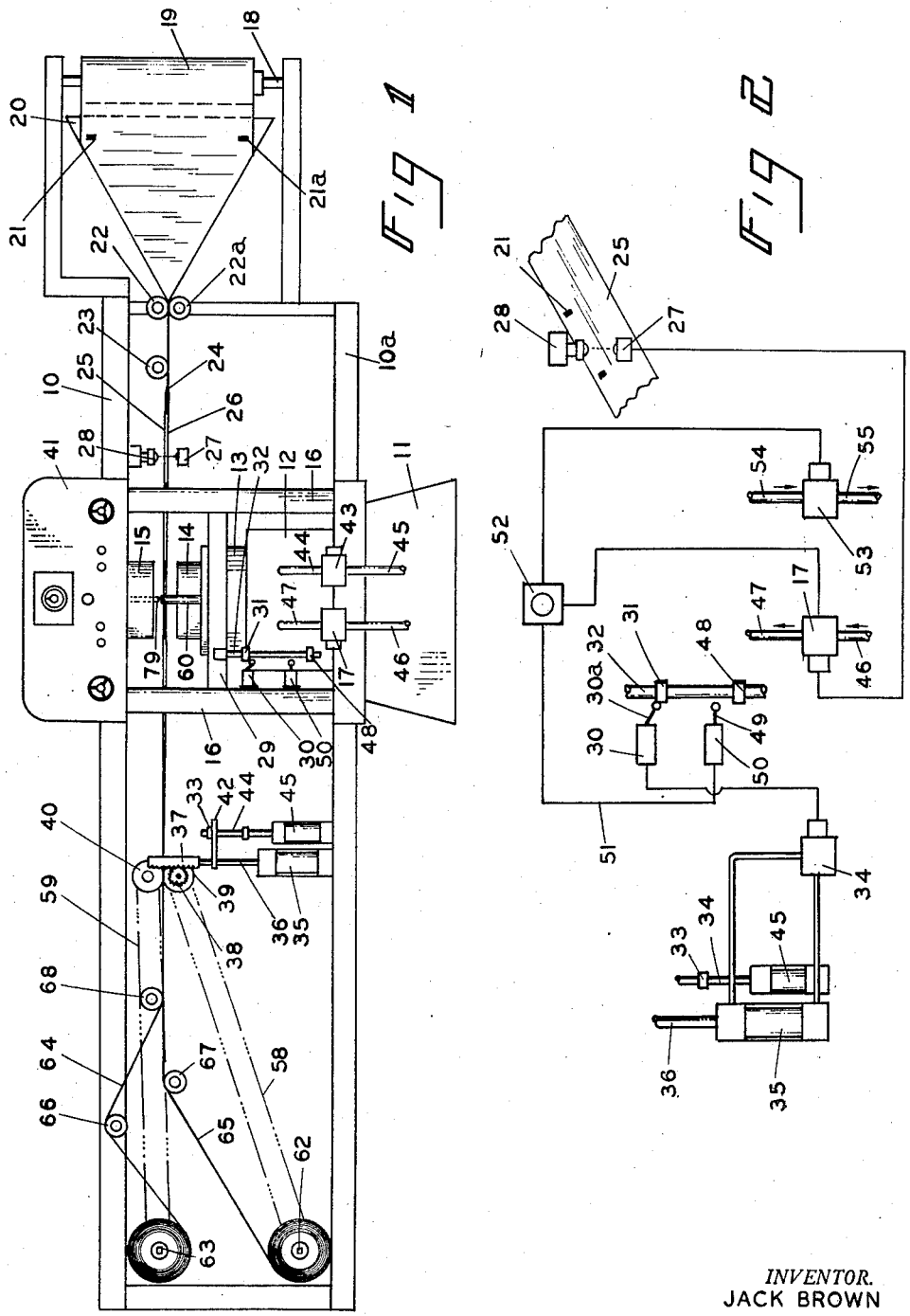
INVENTOR.
JACK BROWN
BY
*J. Louis Wool*
ATTORNEY Dec. 2, 1958   J. G. BROWN   2,862,233
METHOD AND APPARATUS FOR THE MANUFACTURE
OF PHONOGRAPH RECORDS
Filed April 23, 1956   2 Sheets-Sheet 2
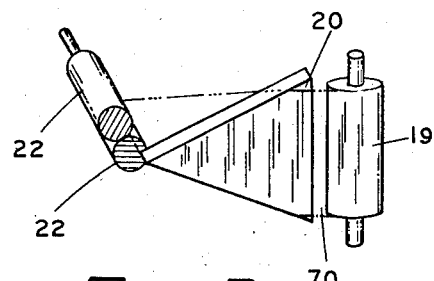
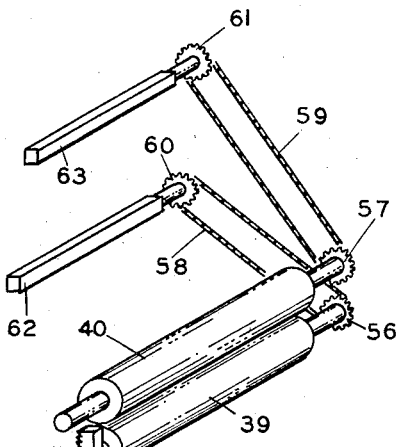
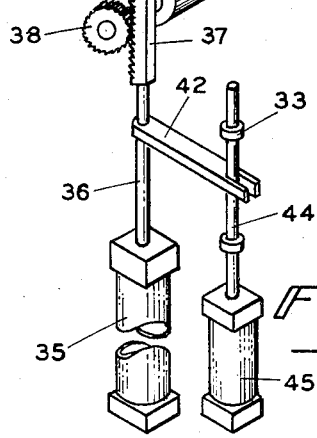
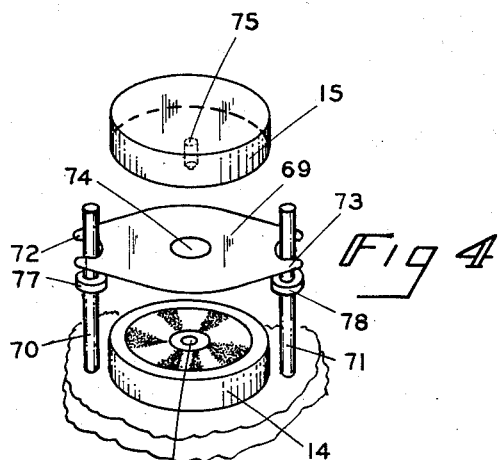
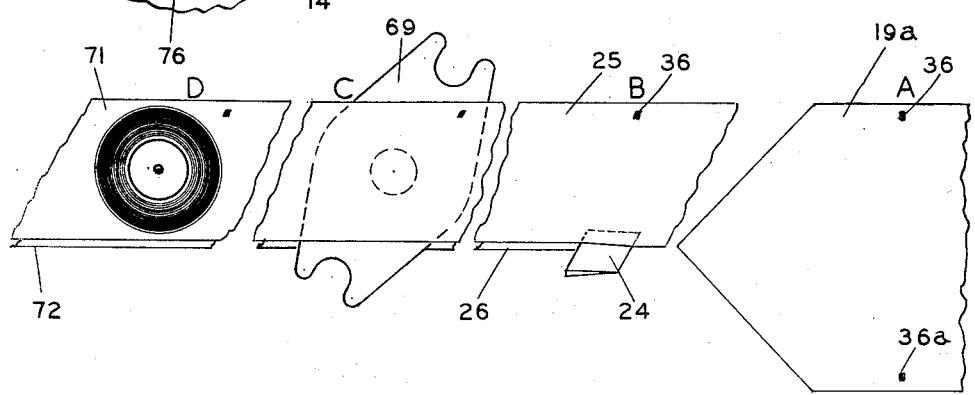
INVENTOR.
JACK BROWN
BY
ATTORNEY United States Patent Office 2,862,233
Patented Dec. 2, 1958

2,862,233

METHOD AND APPARATUS FOR THE MANUFACTURE OF PHONOGRAPH RECORDS

Jack G. Brown, Los Angeles, Calif.

Application April 23, 1956, Serial No. 580,110

12 Claims. (Cl. 18—5.3)

The present invention relates to a method and apparatus for the manufacture of phonograph records. More particularly, this invention relates to a novel method and apparatus for the manufacture of phonograph records by the automatic intermittent impression of record grooves upon an elongated sheet or film of plastic material.

Phonograph records are now commonly manufactured by introducing a predetermined quantity of a thermosetting plastic into a closed mold wherein the plastic assumes the configuration of the mold which bears the pattern of the record grooves thereon upon the application of heat and pressure. In applicant's copending application Serial No. 461,538, filed October 11, 1954, entitled Method and Apparatus for the Manufacture of Phonograph Records Produced Thereby, of which the present application is a continuation-in-part, he has described a method and apparatus for the automatic and intermittent impression of record grooves upon elongated sheets or film of sheet plastic material. In that application the method and apparatus are operated by the use of purely mechanical means with two superimposed sheets of the plastic material being supplied from separate feeding means. Applicant has now developed an improved method and apparatus wherein the sheet plastic material is supplied from a single roll of double width and is automatically folded and slit into two portons of equal width with each portion being supplied to the impression means one above the other. By the provision of preprinted targets upon the sheet material the entire feeding and pressing operation is controlled electronically by means of a single electric eye target control means. At the same time the material may be preprinted with titles, ornamented patterns, or the like and because of the fact that the two sections are slit from a single sheet the two strips may be fed and impressed in accurate register, which would not be readily feasible in a strictly mechanical operation particularly where the strips are fed from separate rolls.

It is therefore an object of the present invention to provide a method and apparatus for the automatic and step by step impression of phonograph record grooves upon a sheet of plastic material.

It is a further object of the present invention to provide a method and apparatus for the automatic impression of phonograph grooves upon sheet material in which the operation and spacing of the successive impressions are automatically controlled.

It is still a further object of the present invention to provide a method and apparatus for the impression of phonograph record grooves upon a plurality of sheets of plastic material simultaneously, said sheets having been derived from a single sheet of plastic material which is fed into the apparatus.

In accordance with the present invention, applicant utilizes a single sheet of plastic material which it at least double the desired width of the individual sheets which are introduced through the means for impressing the phonograph record grooves. This sheet is fed into the equipment from a single roll and is folded as it enters the impressing equipment so that two overlapping layers are formed which are slit to form two separate superimposed sheets or strips. These superimposed strips are drawn through the equipment and intermittently impressed at spaced intervals. Although the superimposed sheets may be drawn through the equipment at regulated intervals to obtain proper spacing by means of mechanical control means, it has been found that more accurate spacing and registry of preprinted material, if present, may be more readily achieved by utilizing electronic control means actuated by targets which have been prepreprinted upon the sheet material. In the specific embodiment of the invention described below targets are preprinted upon sheet plastic material of a suitable type such as cellulose acetate sheet or film, polyvinyl chloride, polystrene, or the like. The sheet selected is of a width which is double that of the individual sheet which is to be impressed. For example, if a 7 in. diameter record is to be impressed upon a sheet having a width of slightly over 7 in., the initial sheet would have a width of 14 plus inches so that when it is folded over and slit two superimposed sheets of a desired width for impression or embossing would result. It is frequently desired to preprint the sheet material at spaced intervals so that the final product will have the printed information in the right location. In order to accurately control the spacing of the impressions, targets are also preprinted at each edge of the sheet in the proper spacing. As the sheet is drawn through the apparatus it is folded with the targets on each half of the sheet in a superimposed relationship. These targets intercept a light beam as they are drawn through the apparatus, actuating the drawing and pressing mechanism described hereafter in such a manner that accurate intermittent operation of the press is obtained. By starting with a double width sheet as described, accurate registry of the record impression with respect to the preprinted material on each sheet is readily obtained.

Referring to the drawings, wherein similar reference characters are employed to denote the same or similar parts:

Figure 1 is a side view in perspective of an apparatus embodying the features of the present invention.

Figure 2 is a fregmentary view showing certain elements of Figure 1 which control the operation of the apparatus.

Figure 3 is an enlarged view showing the structure of the sheet feeding and folding end of the apparatus.

Figure 4 is an enlarged view in perspective of the platens and sheet separating means of the press portions of the apparatus.

Figure 5 is an enlarged view in perspective of the mechanism which serves to draw the sheet material through the apparatus and rewind it.

Figure 6 is a view in perspective of the preprinted sheet in the unfolded and folded positions.

In the drawings, particularly in Figure 1, numerals 10 and 10a designate the steel framework which supports the various elements of the equipment. The frame is in turn supported at an intermediate point by the base of a hydraulic press 11 and by the posts of the press 16. The press includes the pot or cylinder 12, the ram or piston 13 and a pair of molds or record matrices 14 and 15 supported upon the platens of the press, the whole assembly being supported by base 11 and the posts 16 of the press. A roll of sheet plastic material 19 is mounted upon shaft 18. This sheet is cut to have a width double that of the desired final pressed product and is drawn over a triangular folding plate 20. The sheet has opaque targets 21 and 21a preprinted thereon adjacent opposite edges thereof as shown. The targets are spaced along both margins of the sheet and function in a manner to be described below. As the sheet passes over the folding plate it is folded in two, passing between rollers 22 and 22a to impart a crease to the folded edge. The folded sheet is then drawn beneath aligning roll 23 past a knife edge or razor blade 24 mounted with its cutting edge positioned to slit the folded sheet into two equal separate superimposed strips 25 and 26 with the result that the eye targets 21 and 21a also become superimposed. These strips are then drawn past the electric eye target sensing mechanism which is shown at 27 and 28. Element 27 is a light source having its beam focused on photoelectric cell 28. When this beam is interrupted by the opaque target on the strips passing between the light source and the cell, the timing sequence controlling the operation of the hydraulic press is initiated. This sequence is discussed in greater detail below. During the pressing portion of the sequence the strips stop between molds or record matrices 14 and 15 mounted upon lower movable platen 29 and an upper stationery platen (not shown), respectively, and pressure is applied to the upper surface of the top strip and to the lower surface of the bottom strip by the platens coming together, either through movement upward of the lower platen in the type of press as shown in Figure 1, or by downward movement of the upper platen in a suitable press of such type. Since the platens are heated and bear the record groove matrices thereon, the groove impressions are impressed upon the plastic film through the application of heat and pressure for a predetermined time. When pressure has been applied for the required time the cycle is so timed that the platens separate, the film transport mechanism is actuated, and the strips drawn forward another increment until the next target is initiated.

The operation of this cycle is illustrated in Figures 2 and 3. In the starting position of each cycle the platens are separated and piston 13 of Figure 1 carrying platen 29 is in the down position. Microswitch 30 is closed. This switch is actuated by a projection 31 on a vertically slidable rod 32 attached to base plate 24. When microswitch 30 is closed through the actuation of arm 30a by 31, an electrically or solenoid operated air valve 34 is opened admitting air under pressure into air cylinder 35 which in turn extends rod 36 having rack 37 attached thereto as shown in Figures 1 and 3. This rack engages pinion gear 38 which revolves roller 39 and roller 40 bearing upon 39. These rollers are of rubber or other resilient material and engage the superimposed impressed strips of film between them so that the rotation thereof of the bottom roll away from the press will advance the strips of impressed film, drawing them between the platens of the press past the electronic target means and slitting knife, and over the folding member from the supply roll 19 as described above. In starting the equipment a switch on panel 41 mounted on the frame will open air valve 34 to initiate the sequence of operations, after which each cycle is automatically reset. As the superimposed strips are advanced, yoke 42, which is fastened to rod 36, contacts adjustable stop 33 on rod 44 which is an extension of the piston in cylinder 45 which is a self-contained unit of hydraulic resistance or hydrocheck. The arms of the yoke engage the stop and the retarding action of the unit will retard the rate of movement of the rack and pinion and the movement of the strips during a short increment of distance as the strip approaches the target in its movement until the superimposed targets 21 and 21a interrupt the light beam between the light source 27 and photoelectric cell 28, thus preventing mechanical overrunning and permitting accurate register of the target. The interruption of the light beam by the target opens solenoid operated valve 17 which permits fluid from a hydraulic system to enter cylinder 12 through conduits 46 and 47 thus raising the piston 13 disengaging projection or dog 31 from microswitch arm 30a thereby closing valve 34 and deactuating air cylinder 35 returning rack 37 to its starting position. Pinion 38 is attached to the shaft of roll 39 through a slip clutch which permits return of the rack without reversing the rotation of the roll. At the same time, as the platen rises, dog or projection 48 engages arm 49 closing microswitch 50 which in turn sets an automatic timer 52 through circuit 51. At the end of a pre-set time interval the timer de-energizes solenoid valve 17 thus closing the valve and simultaneously energizes solenoid controlled valve 53 which relieves pressure in cylinder 12 and returns hydraulic fluid to the hydraulic system through conduits 54 and 55. This allows the platen 29 to descend and return to its starting position thereby opening microswitch 30 and closing microswitch 50, thereby advancing the web and restarting the cycle of operations.

The rewinding of the strips after the record impressions have been made is illustrated at the left of Figure 1 and in detail in Figure 5. Rolls 39 and 40 drive chains 58 and 59 through sprocket gears 56 and 57, respectively. The chains drive shafts 62 and 63 through sprocket gears 60 and 61, respectively. Spools are mounted on these shafts and on these spools the separate impressed strips of plastic 64 and 65 are rewound after passing over guiding rolls 66 and 67. Roll 68 is provided to maintain the strips in lateral alignment in cooperation with roll 23.

While the two superimposed strips may be pressed between the record matrices in back to back relationship if desired, it has been found preferable to provide a stripper plate assembly such as is illustrated in Figure 4. A relatively thin metal plate of aluminum or sheet steel 69 is slidably positioned over posts 70 and 71, being notched out at 72 and 73 to permit ready replacement. Stops 77 and 78 are provided for the plate to rest on in horizontal position. In use, the two strips are separated vertically one passing between the upper surface of the stripper plate and the mold or record matrix 15, the other passing between the bottom surface of the stripper plate and the lower record matrix 14. It is generally preferable to provide the surfaces of the stripper plate with cushioning layers of thin, fairly hard rubber or the like to cushion the impressions further. A central opening 74 is provided in the stripper plate where it is desired to punch a center hole in the impression simultaneously with the pressing operation by means of a punch 79 mounted on the top platen and extending through opening 75 in top matrix 15 and entering opening 76 in the bottom matrix when the bottom platen is elevated. The folding arrangement is illustrated in Figure 3. The sheet is unrolled from roll 19 and as it is drawn between opposed rolls 22 and 22a it is folded over the surface of triangular folding plate 20.

Figure 6 shows sheet plastic material 19a as it may be preprinted with rows of targets 21 and 21a as well as titles or other information designed to coincide with each successive record impression. This figure also illustrates how the sheet appears after folding and slitting in the apparatus of Figure 1. As shown, the double width sheet is folded in such a manner that the targets 21 and 21a are superimposed. Slitting is carried out by blade 24 and the two separate strips 25 and 26 are drawn between the platens of the press with stripper plate 69 in between. The four stages of the cycle are illustrated by A, B, C, D, with A illustrating the preprinted double width sheets, B the folded, slit and superimposed strips, C the strips in the press with the stripper plate in between, and D the finished strips with records thereon prior to rewinding.

In general, such plastic sheet materials as cellulose acetate, polystyrene, polyvinyl chloride and the like, which are thermoplastic, may be utilized in the present method and apparatus. Various film thicknesses may be utilized, ranging from one mil gauge to 20 mils or more. Suitable temperatures and pressures will be utilized depending upon the material used, the length of the impressing time, etc. Temperatures below the normal softening temperature of the plastic are generally desirable. In the case of cellulose acetate, pressures of 1000 to 1500 pounds per square inch, temperatures of 150° F. to 200° F. and impression times of from 2 to 6 seconds are preferred. Instead of utilizing all plastic films or sheets, laminates may also be used, such as one or two sided laminates of one or two mil film to paper or light cardboard.

The improved process and apparatus may be utilized with various alterations and modifications by those skilled in the art without departing from the spirit of the invention or the scope of the appended claims.

I claim:

1. A method for the manufacture of embossed plastic sheet material wherein the embossed areas are duplicated at regular intervals upon an elongated sheet or film of plastic material and wherein preprinted material is positioned on said sheet in a predetermined position with respect to such embossed areas, which comprises selecting a sheet of plastic material having a width at least double the desired width of the final product, preprinting said sheet with a double row of laterally and longitudinally spaced printed impressions, each impression being positioned in the desired ultimate position with respect to a corresponding embossed area to be formed in said sheet, folding said sheet longitudinally to form two superimposed sheets with said preprinted impressions also superimposed in their desired positions, and feeding said sheets between pressure embossing means positioned to engage the corresponding outer surfaces of said superimposed sheets and successively subjecting predetermined longitudinally spaced areas of said superimposed sheets to heat and pressure whereby superimposed embossed impressions are simultaneously formed in said superimposed sheets in a predetermined position with respect to said preprinted impressions.

2. A method according to claim 1 wherein the embossed areas comprise phonograph record grooves impressed by means of heat and pressure into said plastic sheet material.

3. A method for the manufacture of phonograph records which comprises preprinting an elongated sheet of flexible thermoplastic material with a double row of parallel longitudinally spaced impressions, folding said sheet longitudinally between said rows, slitting said sheet along said folded line to form separate strips of thermoplastic material, superimposing the said strips while maintaining the preprinted impressions thereon in the same longitudinal alignment as in the original unfolded sheet, feeding said superimposed strips between opposed record groove matrices and applying heat and pressure thereto at successive intervals to simultaneously impress record grooves on the outer surfaces of said strips, said grooves being formed in a predetermined position with respect to said preprinted impressions.

4. A method according to claim 3 wherein the flexible preprinted sheet is fed to the folding, slitting and impressive means intermittently at predetermined intervals, timed to correspond to the longitudinal spacing of the preprinted impressions.

5. A method according to claim 4 wherein the sheet of flexible thermoplastic material is preprinted with opaque areas at spaced intervals, which opaque areas are superimposed during the folding operation and wherein the control of the intermittent feed is by means of an electronically activated control means actuated by said opaque areas.

6. A method for the manufacture of phonograph recordings wherein record grooves are impressed upon thermoplastic sheet materials by means of heat and pressure which comprises preprinting an elongated sheet of flexible thermoplastic material with relatively opaque target areas at longitudinally spaced intervals, longitudinally folding said sheet into two substantially equal portions with said opaque areas superimposed, slitting said folded sheet along the fold line to form two separate superimposed strips of thermoplastic material with said areas superimposed and in registry with each other, intermittently feeding said superimposed strips between opposed spaced record groove matrices, applying heat and pressure to predetermined spaced areas of said opposed strips through said record matrices for controlled periods of time, and controlling the feeding of said strips by electronic means actuated by interception of a light beam by said opaque areas.

7. A method according to claim 6 wherein the superimposed strips are separated by a cushioning member during the application of heat and pressure.

8. An apparatus for the manufacture of sheet plastic material having phonograph record grooves impressed thereon which comprises a pair of opposed spaced pressure record groove embossing means, means for feeding a pair of superimposed elongated strips of sheet plastic material each having electric eye targets positioned at longitudinally spaced intervals along said strip between said embossing means, electric eye control means positioned in the path of said targets so as to be activated thereby, timing means activated by said targets and said control means to automatically stop said strip feeding means and simultaneously actuate said embossing means to bring them into engagement with said superimposed sheets and impress said phonograph records upon opposed surfaces thereof for a predetermined timed period, and means to actuate said strip feeding means upon the elapse of said predetermined time period and to actuate means for drawing impressed strips away from said embossing means thereby simultaneously advancing said pair of superimposed strips bearing other eye targets into position to operate control means and reactuate said timing means.

9. An apparatus according to claim 8 which includes means for feeding a strip of at least double width sheet thermoplastic material, said strips having eye targets positioned at equally spaced intervals adjacent opposite edges, means for folding said sheet into two strips of equal width with the opposite targets in superimposed position, and means for intermittently feeding said superimposed strips between the opposed pressure embossing members by means of electric controls actuated by engagement of said superimposed targets by a beam of light.

10. An apparatus for the manufacture of phonograph records having preprinted impressions thereon which comprises a pair of spaced pressure embossing means bearing record matrices, means for longitudinally folding a single sheet of at least double width thermoplastic material which has been preprinted with two parallel rows of longitudinally spaced printed impressions into two superimposed strips of substantially equal width in which the preprinted impressions are also superimposed, means for slitting said folded sheet along the folded line to form two separate superimposed strips of sheet material while maintaining the relative superimposed position of the preprinted material on said sheets, means for drawing said superimposed strips of sheet material between said record matrices, means for intermittently actuating said pressure embossing means while the superimposed strips are in a stationary position therebetween to simultaneously impress record grooves upon the opposite outer surfaces of said sheets, and time controlled means for deactivating said pressure embossing means and actuating said drawing means to bring successive areas of said sheet material into engagement with said embossing means.

11. Apparatus according to claim 10 wherein a stripper plate is interposed between said strips while they are engaged by said embossing means.

12. Apparatus according to claim 11 wherein said stripper plate has resilient cushioning surfaces upon opposite surfaces engaging said strips.

References Cited in the file of this patent

UNITED STATES PATENTS

| | | |
|---|---|---|
| 1,996,057 | Buckle | Apr. 2, 1935 |
| 2,650,822 | Wyza | Sept. 1, 1953 |
| 2,653,508 | Whiteley | Sept. 29, 1953 |